US005934116A

United States Patent [19]

Moore

[11] Patent Number: 5,934,116

[45] Date of Patent: Aug. 10, 1999

[54] LOCKING APPARATUS FOR LOCKING THE REAR DOORS OF A TRAILER

[76] Inventor: Donald F. Moore, 4825 Sturbridge Ln., Memphis, Tenn. 38141

[21] Appl. No.: 09/075,853

[22] Filed: May 11, 1998

[51] Int. Cl.$^{6}$ .......... B60R 25/02

[52] U.S. Cl. .......... 70/212; 70/56; 292/218; 292/259 R

[58] Field of Search .......... 70/209, 212, 198–202, 70/417, 54–56; 292/218, 259 R

[56] References Cited

U.S. PATENT DOCUMENTS

| | | | |
|---|---|---|---|
| 3,280,606 | 10/1966 | Howard et al. | 292/259 R |
| 3,601,453 | 8/1971 | Silverman | 303/89 |
| 3,656,788 | 4/1972 | Emery | 292/148 |
| 3,813,119 | 5/1974 | Panici | 292/122 |
| 3,819,216 | 6/1974 | Richardson | 292/259 R |
| 3,843,174 | 10/1974 | Bugunovich et al. | 292/166 |
| 3,943,738 | 3/1976 | Foote | 70/200 X |
| 4,023,388 | 5/1977 | Moravi | 70/455 |
| 4,078,836 | 3/1978 | Wilson | 292/259 R |
| 4,157,653 | 6/1979 | Dahanyos | 70/417 |
| 4,262,503 | 4/1981 | Kuebler | 70/101 |
| 4,389,354 | 6/1983 | Hastings | 70/2 |
| 4,491,354 | 1/1985 | Williams | 292/148 |
| 4,500,123 | 2/1985 | Harms | 292/259 |
| 4,602,720 | 7/1986 | Mattsson | 220/315 |
| 4,627,248 | 12/1986 | Harwoth | 70/134 |
| 4,640,109 | 2/1987 | Schaublin et al. | 70/202 |
| 4,669,767 | 6/1987 | Leto | 292/259 |
| 4,762,350 | 8/1988 | Hurtado | 292/259 R |
| 4,779,910 | 10/1988 | Dameron | 292/259 R |
| 4,883,294 | 11/1989 | Goodspeed | 70/56 X |
| 4,889,372 | 12/1989 | Dege et al. | 292/218 |
| 5,035,127 | 7/1991 | Larsen | 70/417 X |
| 5,062,669 | 11/1991 | McManigal et al. | 292/60 |
| 5,077,940 | 1/1992 | LaRose, Jr. | 292/259 R X |
| 5,145,222 | 9/1992 | Meyer | 292/218 X |
| 5,284,036 | 2/1994 | Roesenbaum | 70/200 X |
| 5,433,093 | 7/1995 | Sooth | 70/56 |
| 5,588,314 | 12/1996 | Kenzovich | 70/56 |
| 5,701,768 | 12/1997 | Khalsa | 70/212 X |

FOREIGN PATENT DOCUMENTS

| | | | |
|---|---|---|---|
| 2916167 | 11/1979 | Germany | 70/101 |

*Primary Examiner*—Suzanne Dino Barrett
*Attorney, Agent, or Firm*—Garvey, Smith, Nehrbass & Doody, LLC

[57] ABSTRACT

A locking apparatus is provided for locking the rear doors of a trailer that has door closing members that include left and right vertical bars on the doors and horizontal clasps that attach respectively to the bars. The apparatus includes a pair of structural blocks that are attached to the doors using bolting or welding for example. A hollow spanning member is transversely positioned to span between the blocks, the spanner member having a central open-ended bore that communicates with preferably both end portions of the bar. Each of the blocks has a receptacle that slidably receives an end portion of the bar. One of the blocks has a vertical channel that extends through the block between its upper and lower surfaces and which communicates with the receptacle. This enables a locking member to be positioned in the channel and form a connection with the bar at the intersection of the receptacle and the channel. The locking member can be keyed or provided with tumblers having a combination that prevents theft if the combination is unknown.

15 Claims, 3 Drawing Sheets

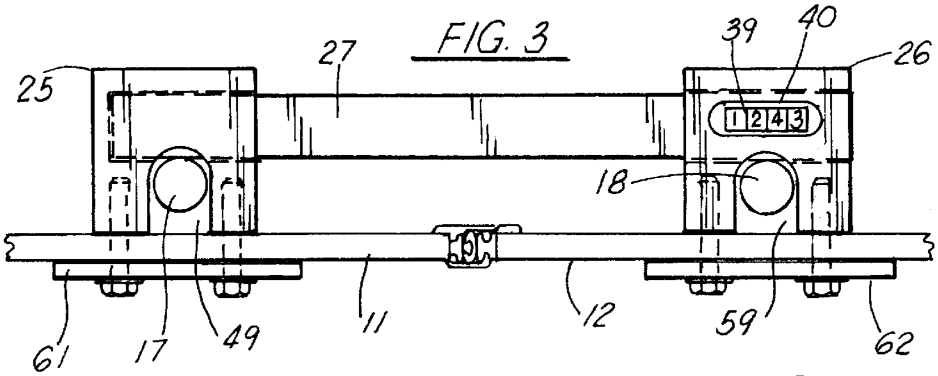
FIG. 3
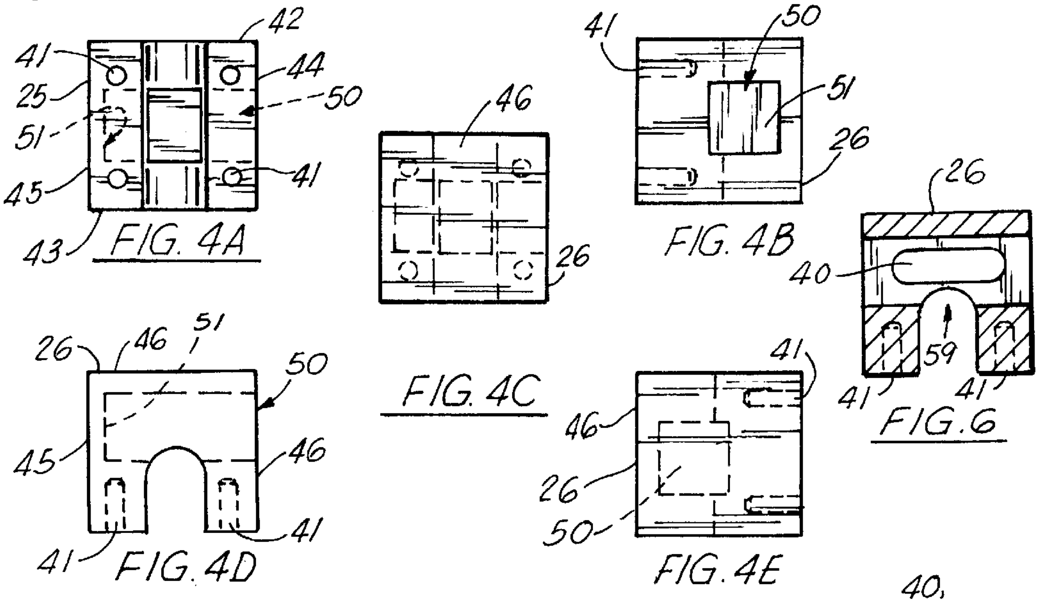
FIG. 4A
FIG. 4B
FIG. 4C
FIG. 4D
FIG. 4E
FIG. 6
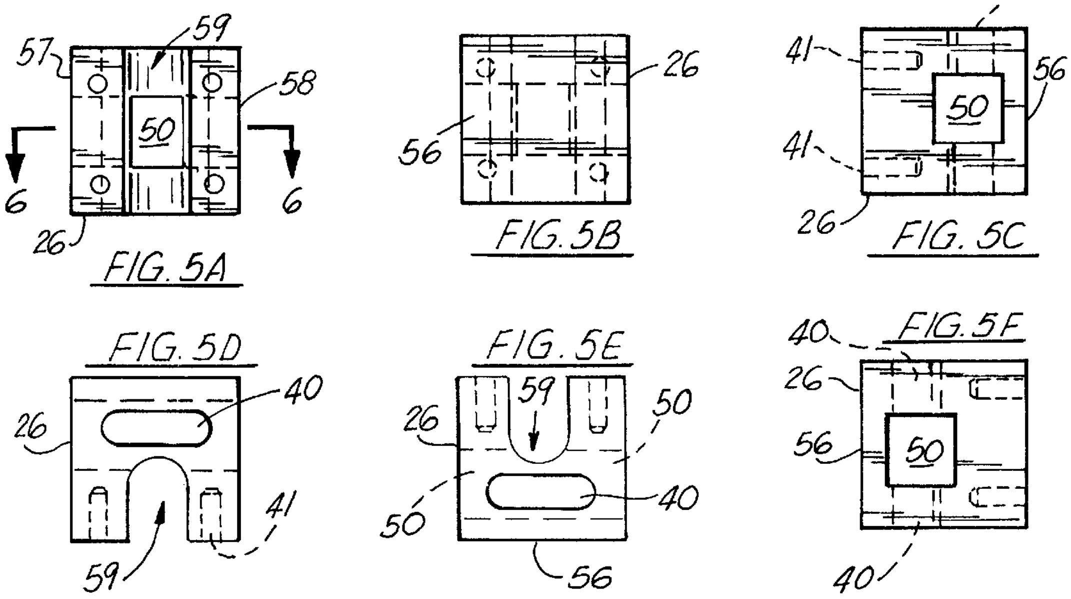
FIG. 5A
FIG. 5B
FIG. 5C
FIG. 5D
FIG. 5E
FIG. 5F

LOCKING APPARATUS FOR LOCKING THE REAR DOORS OF A TRAILER

BACKGROUND OF THE INVENTION

1. Field of the Invention

The present invention relates to tractor trailer rigs and more particularly to an improved locking apparatus that locks the rear doors of such a trailer using a pair of spaced apart structural blocks that receive a hollow spanning member or bar transversely positioned to span between the blocks. One of the blocks has a vertical channel that receives a locking member that attaches to the spanning member during use and that can be keyed or provided with a tumbler.

2. General Background of the Invention

Most large trailer configurations such as the tractor trailer rig (commonly referred to by the nickname "eighteen wheeler") have a pair of pivotally mounted rear doors that can be opened to completely expose the cargo area. One of the problems facing the cross country trucking industry is the theft of tractor trailer rigs that are stored temporarily and disconnected from the truck or tractor portion. These trailers can be stolen using an additional truck or tractor trailer occupied by the thief. If the thief obtains access to the bill of lading, forced entry to the trailer can result in loss of all or part of the cargo even if the trailer is not stolen. Thus, pilfering from an unintended trailer can be a problem, as when one is in "piggyback" transit by rail or when it is in a yard unattended by a tractor operator without an attached tractor.

One of the problems that faces the operator of truck lines or an individual truck owner is that of the bill of lading that is often fastened or taped to the rig of the truck in plain view. If the thief is able to review the bill of lading, the thief knows the value, or at least the approximate value, of the contents.

There have been many locking systems for truck doors that have been patented. An example of such a patent is the Silverman U.S. Pat. No. 3,601,453 entitled "Safety Lock for Trailer Doors". The '453 patent discloses a locking apparatus for a trailer door wherein a power lock for the door is mounted in a position inaccessible from the outside of the trailer and for its operation, requires power such as air pressure or 12 volt electricity, which is available from a tractor, to unlock it.

The Panici U.S. Pat. No. 3,813,119 discloses a protection system for box car doors. In the '119 patent, a latch system includes a pneumatic cylinder with suitable linkage and two metal arms with hooks formed at end. When air pressure is applied to the cylinder, hooks unlatch. As air pressure is released, spring returns cylinder piston to its original position, thereby latching the doors closed.

An anti-theft door locking apparatus is the subject of U.S. Pat. No. 3,843,174. The apparatus is for use with semitrailers, delivery vans, railway cars, and similar freight storage and transport vehicles to prevent pilferage from the freight compartments thereof. The apparatus includes a reciprocal locking pin selectively movable between an active position in cooperative engagement with the access door of a freight compartment to constrain the door in the closed position thereof and an inactive position releasing such door for movement. The locking pin is controlled by plunger means movable between operative and inoperative positions respectively corresponding to the active and inactive positions of the locking pin and connected therewith so as to control the position thereof. The plunger means are biased toward the operative position thereof by spring structure which therefore tends to maintain the locking pin in its active position, and selectively operative energizing means which may be mechanical in nature or pneumatic, depending upon the embodiment of the invention, are effective to displace the plunger means against the biasing force of such spring and thereby displace the locking pin into its inactive position. Special equipment such as a source of compressed air provided by the tractor of a tractor-semi-trailer rig or a forklift truck capable of providing a pulling force of substantial magnitude is required to supply the energizing means required to displace the locking pin into its inactive position. However, such special equipment is generally available to authorized personnel but not to those who might pilfer freight. The apparatus also includes operation-inhibiting means in the form of an abutment component or a detent and recess arrangement to hold the locking pin in its inactive position once it has been appropriately displaced thereinto so as to prevent inadvertent or unauthorized return movement of the locking pin into the active position thereof.

In the Morvai U.S. Pat. No. 4,023,388, there is provided a lock cover device particularly intended for use with so-called mortise locks. The device is fabricated of resilient polymeric material which may be readily mounted over the mortise lock, normally without the requirement for completely removing the lock from its mounted position and is characterized by the incorporation of a movable shutter member selectively shiftable between a stable sealing position and a stable keyway exposing position, the assembly including resilient cam and follower means for selectively biasing the shutter to one or the other of said stable positions, the shutter being preferably unstable at any intermediate position.

In the Dohanyos U.S. Pat. No. 4,157,653, there is provided a shielded lock assembly incorporating a body surrounding a deadbolt subassembly. The body renders more difficult access to the deadbolt subassembly in order to reduce the incidence of theft involving the prying, cutting, or other destruction of the deadbolt subassembly. In one embodiment of the invention, the deadbolt subassembly is received within a retaining cage which is itself received within the body. Aperture means are provided in the body and the retaining cage which are adapted to receive at least one locking bracket or staple in locking alignment with the deadbolt.

A trailer door lock system is disclosed in U.S. Pat. No. 4,627,248 issued to David Haworth. The Haworth patent discloses a lock device for a hinged cargo door of a truck trailer that has a housing with a vertically extended groove in one side wall for receiving the rotatable cargo door lock bar. A transversely extended lock pin in the housing is transversely movable through an opening in the same side wall for insertion into a registered hole in the cargo door lock bar in the locked position thereof. Transverse movement of the lock pin is controlled by a simple lock mechanism including a key operated lock shaft having a rocker arm rotatable therewith and having a free end connected to the lock pin for transverse movement of the lock pin in response to rotation of the lock shaft.

A secured locking device is the subject of U.S. Pat. No. 5,062,669 issued to McManigal et al. The '669 patent discloses a lock mechanism for safely locking doors, such as trailer-tractor vehicle doors and for controllably releasing same including a reciprocal or rotatable locking member such as a sliding bolt movable up through the floor of a trailer to a first locking position wherein a door is positively locked and a release position wherein the vehicle door is released with the locking member housed in a tamper-proof box with a pivotal panel that is held shut by a latch released by a latch operator means which is activated by an air drive that can be primarily operated only when connected to the air pressure system of a vehicle.

U.S. Pat. No. 5,685,578 issued to Schneider discloses a door locking mechanism for use with a door having a door latch assembly and a stationary catch including a locking rod movable between a locking position and a release position. In its locking position, the locking rod extends into aligned passages formed in a latch member and a stationary catch member of a door latch assembly, which are engaged with each other in a latched position to maintain the door in a closed position. This prevents disengagement of the latch member from the catch member, to prevent opening of the door. In its release position, the locking rod is withdrawn from at least the latch member passage, to enable the latch member to be disengaged from the catch member and to allow opening of the door. The locking rod is interconnected with a piston disposed within a cylinder. A spring urges the piston toward a position placing the locking rod in its locking position. Fluid pressure is selectively provided to the side of the piston opposite the spring, for selectively overcoming the biasing force of the spring and to move the piston to a position placing the locking rod in its release position. The locking mechanism can be advantageously used with a trailer having a pneumatic system, such that supply of pressurized air in the trailer's pneumatic system is communicated to the piston to place the locking rod in its release position whenever a source of air pressure exceeding a predetermined threshold is connected to the trailer's pneumatic system.

These prior art locking arrangements are complicated and do not provide a universal lock arrangement that can be used with virtually every type of pivoting rear door arrangement for a large cargo-type trailer.

BRIEF SUMMARY OF THE INVENTION

The present invention provides an improved locking apparatus for locking the pivoting rear doors of a trailer having vertical bars and horizontal clasps that attach respectively to the bars. In some instances, these locking bars are cam type bars.

The apparatus includes a pair of structural blocks that are attached respectively to the doors such as by welding, bolting or the like.

A hollow spanning member is transversely positioned to span between and removably connect to the blocks, the spanning member having a central bore that is open to communicate with at least one end portion of the bar.

Each of the blocks provides a transverse socket or receptacle that receives an end portion of the bar.

One of the blocks has a channel that extends at angles to the socket or receptacle, preferably at ninety degrees with respect to the receptacle.

A locking member occupies the channel during use. The locking member is positioned to form a connection with the bar at the intersection of the transverse socket or receptacle and the channel.

The locking member can be keyed or provided with tumblers having a combination that opens the locking member when correctly dialed on the tumblers.

The spanning member preferably provides a longitudinally extended bore that holds a document containing information that specifies the cargo of the trailer. This document can be, for example, a bill of lading.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a bottom view of the preferred embodiment of the apparatus of the present invention illustrating the locked position;

FIG. 4*a* is a partial elevational view of the preferred embodiment of the apparatus of the present invention illustrating one of the locking blocks;

FIG. 4*b* is another view of one of the locking blocks showing the transverse socket portion thereof;

FIG. 4*c* is a bottom view of one of the locking blocks;

FIG. 4*d* is a top view of one of the locking blocks;

FIG. 4*e* is a side view of one of the locking blocks;

FIG. 5*a* is an end view of one of the locking blocks that carries the lock channel;

FIG. 5*b* is a elevational view of the block member of FIG. 5*a;*

FIG. 5*c* is a side view of the lock block of FIGS. 5*a* and 5*b* and showing the transverse socket portion thereof;

FIG. 5*d* is a top view of the lock block of FIGS. 5*a*–5*c* showing the vertical channel that holds the locking member;

FIG. 5*e* is a bottom view of the lock block of FIGS. 5*a*–5*d;*

FIG. 5*f* is a side view of the locking block of FIGS. 5*a*–5*e*; and FIG. 6 is a sectional view taken along lines 6—6 of FIG. 5*a*.

DETAILED DESCRIPTION OF THE INVENTION

Figure 1:
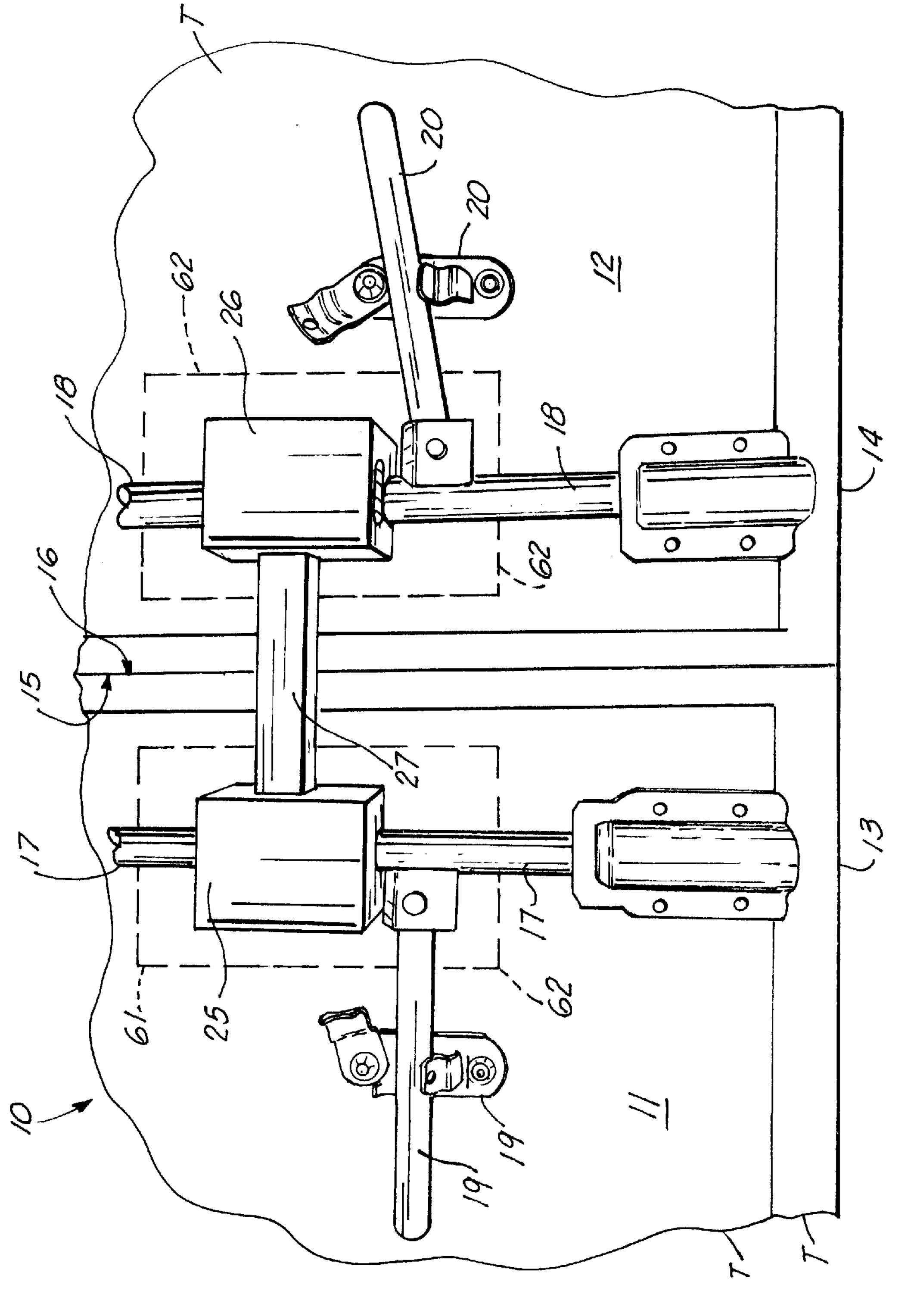
FIG. 1 is a perspective elevational view of the preferred embodiment of the apparatus of the present invention.
Figure 2:
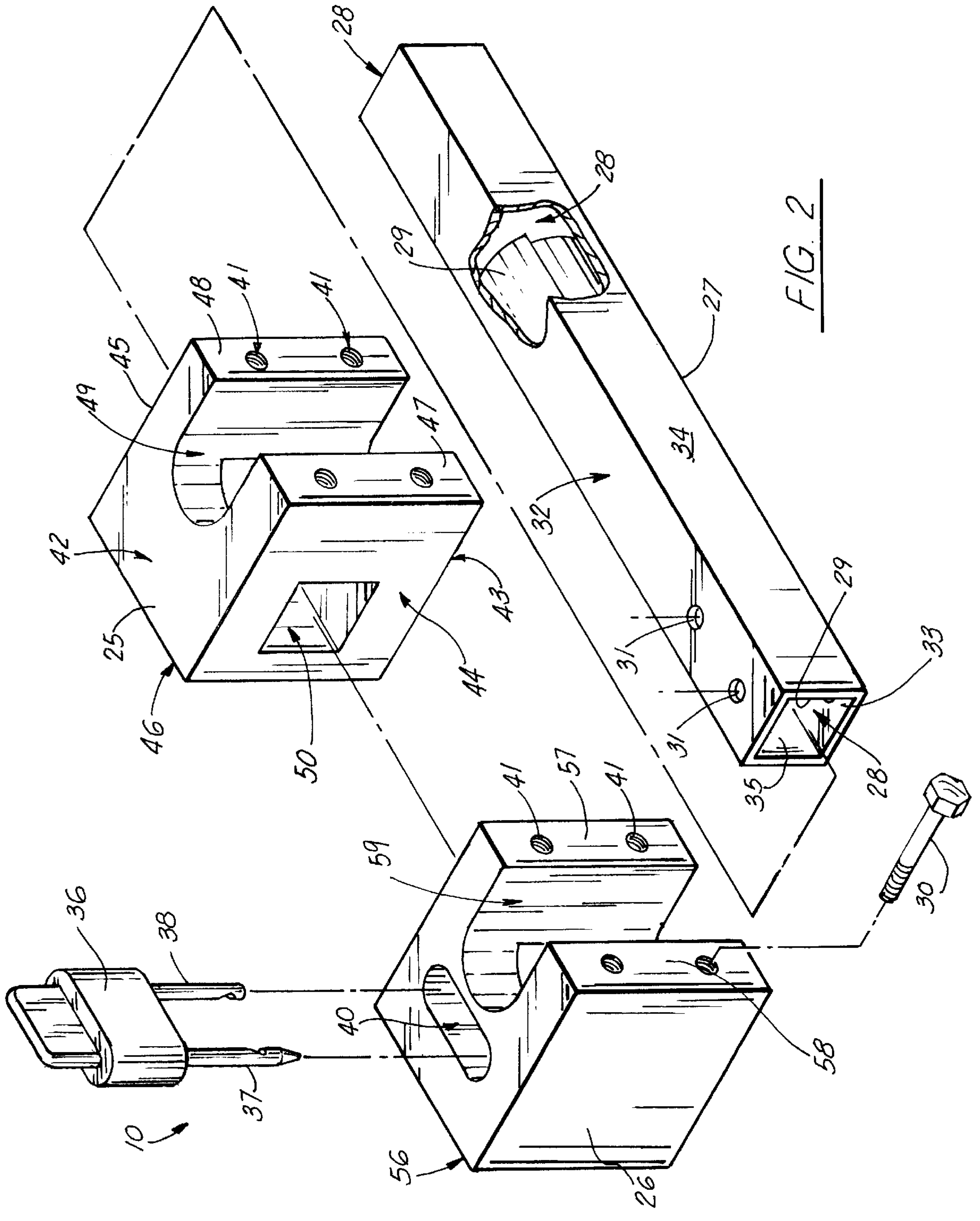
FIG. 2 is a perspective exploded view of the preferred embodiment of the apparatus of the present invention.

FIGS. 1–3 show generally the preferred embodiment of the apparatus invention designated generally by the numeral 10 in FIGS. 1–3. Trailer door locking apparatus 10 is useful in locking the two doors 11, 12 of a trailer. Each door 11, 12 provides a bottom edge 13, 14 respectively and a vertical edge 15, 16 that swings to open and expose the cargo area of the trailer. The vertical edges 15, 16 align and abut when the doors 11, 12 are closed.

Each of the doors 11, 12 can have a known door closure arrangement such as a pair of vertical locking rods, 17 18 that are equipped with latches 19, 20 that can be manipulated between open and closed positions using handles 21, 22 mounted respectively on pivots 23, 24. Such vertical locking rods and latches 17–20 are known in the art and commercially available.

The trailer door locking apparatus 10 of the present invention includes a left block section 25 and a right block section 26 as shown in FIGS. 1–3. These block sections 26, 27 are preferably of high strength metal construction that resist cutting or burning. A horizontal spanning member 27 extends in between the block sections 25 and 26 as shown in FIG. 1. The horizontal spanning member 27 can be in the form of a rectangular bar of high strength stainless steel for example, having an open ended bore 28 into which documents can be placed such as a bill of lading 29.

The spanning member 27 has a top wall 32, bottom wall 33, side wall 34, and side wall 35. A pair of openings 31 are provided on top wall 32. Openings 31 are correspondingly placed through bottom wall 33. Openings 31 enable lock member 36 to be placed in vertical channel 40, with the shank 37, 38 portions passing through the aligned openings 31 in top wall 32 and in bottom wall 33. A keyed locking member 39 enters channel 40 opposite lock member 38 and forms a connection with shanks 37, 38. The keyed locking member 39 can be provided with a combination lock using a plurality of tumblers as shown in FIG. 3.

Left and right block sections 25, 26 can be held to the doors 11, 12 respectively of the trailer T by welding or using bolted connections such as bolts 30 that fit internally threaded openings 41 of each block section 25, 26. Backing plates 61, 62 (FIGS. 1 and 3) can be used to add strength to such a bolted connection. FIGS. 4A, 4B, 4C, 4D, 4E show block 26 in detail. FIGS. 5A, 5B, 5C, 5D, 5E, 5F, and 6 show block 27 in detail.

In FIGS. 4A–4E, block 25 is shown having top surface 42, bottom surface 43, sides 44, 45, rear surface 46, and front surfaces 47, 48. A U-shaped vertical slot communicates 49 with front surfaces 47, 48. The slot 49 is a space that enables a locking rod 17 to pass through block 25. Horizontal socket 50 extends from side surface 44 to closed end wall 51. The socket 50 can communicate with vertical slot 49 as shown in FIGS. 3 and 4D as long as there is room for both rod 17 and spanning member 27.

In FIGS. 5A–5F and 6, block 26 has an overall shape and configuration that is similar to the block 25. Block 26 has top surface 52, bottom surface 53, sides 54, 55, rear surface 56, and front surfaces 57, 58. A U-shaped vertical slot communicates 59 with front surfaces 57, 58. The slot 59 is a space that enables a locking rod 18 to pass through block 26.

Horizontal socket 60 extends from one side surface 54 to the other side surface 55. On block 26, socket 60 is thus open ended so that a user inserts the spanning member 27 through socket 60 first and then into socket 50 until the spanning member stops at closed end wall 51. When spanning member 27 meets end wall 51, openings 31 are automatically aligned with the shanks 37, 38 of locking member 36. The socket 50 can communicate with vertical slot 49 as shown in FIGS. 3 and 4D as long as there is room for both rod 17 and spanning member 27.

The following table lists the parts numbers and parts descriptions as used herein and in the drawings attached hereto.

PARTS LIST

| Part Number | Description |
|---|---|
| 10 | trailer door locking apparatus |
| 11 | door |
| 12 | door |
| 13 | bottom edge |
| 14 | bottom edge |
| 15 | vertical edge |
| 16 | vertical edge |
| 17 | locking rod |
| 18 | locking rod |
| 19 | latch |
| 20 | latch |
| 21 | handle |
| 22 | handle |
| 23 | pivot |
| 24 | pivot |

-continued

PARTS LIST

| Part Number | Description |
|---|---|
| 25 | left block section |
| 26 | right block |
| 27 | horizontal spanning member |
| 28 | bore |
| 29 | document |
| 30 | bolt |
| 31 | opening |
| 32 | top wall |
| 33 | bottom wall |
| 34 | side wall |
| 35 | side wall |
| 36 | lock member |
| 37 | shank |
| 38 | shank |
| 39 | keyed locking member |
| 40 | vertical channel |
| 41 | internally threaded opening |
| 42 | top surface |
| 43 | bottom surface |
| 44 | side surface |
| 45 | side surface |
| 46 | rear surface |
| 47 | front surface |
| 48 | front surface |
| 49 | slot |
| 50 | socket |
| 51 | end wall |
| 52 | top surface |
| 53 | bottom surface |
| 54 | side surface |
| 55 | side surface |
| 56 | rear surface |
| 57 | front surface |
| 58 | front surface |
| 59 | slot |
| 60 | socket |
| 61 | backing plate |
| 62 | backing plate |
| T | trailer |

The foregoing embodiments are presented by way of example only; the scope of the present invention is to be limited only by the following claims.

I claim:

1. A locking apparatus for locking the rear doors of a trailer having vertical bars and horizontal clasps attached respectively to the bars, comprising:

a) a pair of structural blocks attached respectively to the doors;

b) a hollow bar that is transversely positioned to span between said blocks, said bar having a central bore that is open with at least one end portion of said bar;

c) each of said blocks having a socket that receives an end portion of said bar;

d) one of said blocks having a channel that extends at angles to said socket; and e) a locking member that is received within said channel during use, said locking member being positioned to form a connection with said bar at the intersection of said socket and said channel whereby said locking member is enclosed within said block.

2. The locking apparatus of claim 1 wherein the channel is substantially vertically oriented.

3. The locking apparatus of claim 1 wherein the socket of one of the blocks has a closed end portion.

4. The locking apparatus of claim 1 wherein the socket of one of the blocks is open ended so that the bar can slide into the socket from either of two directions.

5. The locking apparatus of claim 1 wherein one of the blocks has a slot that enables the block to be positioned on top of one of the vertical rods.

6. The locking apparatus of claim 1 wherein each of the blocks has a slot that enables the block to be positioned on top of one of the vertical rods.

7. The locking apparatus of claim 1 further comprising a document that is contained within the bore during use that specifies the cargo of the trailer.

8. The locking apparatus of claim 1 wherein the channel and socket form an angle of more than 45 degrees.

9. The locking apparatus of claim 1 wherein the channel is substantially vertically oriented.

10. The locking apparatus of claim 1 wherein the locking member includes a pair of interlocking portions that are insertable into the channel respectively at the top of the channel and at the bottom of the channel.

11. A locking apparatus for locking the left and right rear doors of a trailer having door closing members that include left and right vertical bars on the doors and horizontal clasps attached respectively to the bars, comprising:

a) a pair of structural blocks that are attached to the doors, including a right block attached to the right door and a left block attached to the left door;

b) a hollow spanning member that is transversely positioned to span between said blocks, said spanning member having a central bore that is open with at least one end portion of said spanning member;

c) each of said blocks having a receptacle that receives an end portion of said spanning member;

d) one of said blocks having a channel that extends at angles to said receptacle; and e) a locking member that is received within said channel during use, said locking member being positioned to form a connection with said spanning member at the intersection of said receptacle and said channel whereby said locking member is enclosed within said block.

12. The locking apparatus of claim 11 wherein the locking member is keyed.

13. The locking apparatus of claim 11 wherein the locking member can be opened with numbered tumblers having a combination that opens the locking member when correctly dialed on the tumblers.

14. The locking apparatus of claim 11 wherein the spanning member has a longitudinally extended bore that holds a document containing information that specified the cargo of the trailer.

15. The locking apparatus of claim 11 wherein the spanning member has a longitudinally extended bore that holds a bill of lading document containing information that specified the cargo of the trailer.

* * * * *